United States Patent
Bulea et al.

(10) Patent No.: US 8,570,297 B2
(45) Date of Patent: Oct. 29, 2013

(54) SYSTEM AND METHOD FOR MEASURING INDIVIDUAL FORCE IN MULTI-OBJECT SENSING

(75) Inventors: Mihai M. Bulea, Santa Clara, CA (US); Thomas E. Shortledge, Menlo Park, CA (US)

(73) Assignee: Synaptics Incorporated, San Jose, CA (US)

( * ) Notice: Subject to any disclaimer, the term of this patent is extended or adjusted under 35 U.S.C. 154(b) by 988 days.

(21) Appl. No.: 12/636,952

(22) Filed: Dec. 14, 2009

(65) Prior Publication Data

US 2011/0141053 A1 Jun. 16, 2011

(51) Int. Cl.
*G06F 3/045* (2006.01)

(52) U.S. Cl.
USPC .......................... 345/174; 345/173; 345/156

(58) Field of Classification Search
USPC .............. 345/173, 174, 161, 175, 156, 179, 8
See application file for complete search history.

(56) References Cited

U.S. PATENT DOCUMENTS

| | | | | |
|---|---|---|---|---|
| 5,739,811 | A * | 4/1998 | Rosenberg et al. | 345/161 |
| 6,492,979 | B1 | 12/2002 | Kent | |
| 8,378,997 | B2 * | 2/2013 | Kuroki et al. | 345/179 |
| 2001/0026266 | A1 * | 10/2001 | Schena et al. | 345/163 |
| 2002/0163509 | A1 * | 11/2002 | Roberts | 345/173 |
| 2003/0085882 | A1 | 5/2003 | Lu | |
| 2006/0244733 | A1 | 11/2006 | Geaghan | |
| 2006/0284856 | A1 | 12/2006 | Soss | |
| 2007/0052690 | A1 * | 3/2007 | Roberts | 345/173 |
| 2007/0247393 | A1 * | 10/2007 | Kuroki et al. | 345/8 |
| 2008/0030482 | A1 | 2/2008 | Elwell et al. | |
| 2008/0238884 | A1 | 10/2008 | Harish | |
| 2009/0201261 | A1 | 8/2009 | Day | |
| 2009/0256807 | A1 | 10/2009 | Nurmi | |
| 2010/0253645 | A1 * | 10/2010 | Bolender | 345/174 |
| 2010/0253651 | A1 * | 10/2010 | Day | 345/175 |
| 2011/0057899 | A1 * | 3/2011 | Sleeman et al. | 345/174 |

OTHER PUBLICATIONS

International Searach Report, PCT/US2010/060090, mailed on Aug. 30, 2011.
Multi-Touch Systems That I Have Known and Loved, Bill Buxton, Microsoft Research, updated on Oct. 9, 2009, retreived on Dec. 12, 2009; URL: http://www.billbuxton.com/multitouchOverview.html.

\* cited by examiner

*Primary Examiner* — Thuy Pardo
(74) *Attorney, Agent, or Firm* — Ingrassia Fisher & Lorenz P.C.

(57) ABSTRACT

An input device is provided that facilitates improved user interface functionality by determining force information for each of multiple objects in a sensing region. The input device includes a processing system, a sensor configured to sense objects in a sensing region proximate a surface, and a plurality of force sensors. The plurality of force sensors are coupled to the surface to provide a plurality of measures of force applied to the surface. The processing system is configured to determine positional information for each the multiple objects sensed by the sensor in the sensing region. Furthermore, the processing system is configured to determine force information for each of the multiple objects from the positional information and the plurality of measures of force applied to the surface. Thus, device and method provides the ability to determine both positional information and force information for each of multiple objects in a sensing region.

25 Claims, 5 Drawing Sheets

SYSTEM AND METHOD FOR MEASURING INDIVIDUAL FORCE IN MULTI-OBJECT SENSING

FIELD OF THE INVENTION

This invention generally relates to electronic devices, and more specifically relates to sensor devices and using sensor devices for producing user interface inputs.

BACKGROUND OF THE INVENTION

Proximity sensor devices (also commonly called touch sensor devices) are widely used in a variety of electronic systems. A proximity sensor device typically includes a sensing region, often demarked by a surface, in which input objects can be detected. Example input objects include fingers, styli, and the like. The proximity sensor device can utilize one or more sensors based on capacitive, resistive, inductive, optical, acoustic and/or other technology. Further, the proximity sensor device may determine the presence, location and/or motion of a single input object in the sensing region, or of multiple input objects simultaneously in the sensor region.

The proximity sensor device can be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device can be integral or peripheral to the computing system with which it interacts.

In the past, some proximity sensors have been implemented with additional ability to detect and determine force applied to a surface of the sensor. For example, by making an estimation of applied force by measuring the increased capacitance that is the result of the increased contact area when a finger is pressed against the surface. Unfortunately, some implementations of these proximity sensors have had limited accuracy when estimating applied force using these techniques. Because of questionable accuracy, such sensors have typically had limited ability to use such determined force as a basis for determining user input. This limits the flexibility of the proximity sensor device to function as an input device. Thus, there exists a need for improvements in proximity sensor device, and in particular, the ability of proximity sensor devices to determine and respond to indications of applied force.

Other desirable features and characteristics will become apparent from the subsequent detailed description and the appended claims, taken in conjunction with the accompanying drawings and the foregoing technical field and background.

BRIEF SUMMARY OF THE INVENTION

The embodiments of the present invention provide devices and methods that facilitate improved device usability. Specifically, the device and method provide improved user interface functionality by facilitating user input determined from both positional information and force information for each of multiple objects in a sensing region. The input device includes a processing system, a sensor configured to sense objects in a sensing region proximate a surface, and a plurality of force sensors. The plurality of force sensors are coupled to the surface to provide a plurality of measures of force applied to the surface. The processing system is configured to determine positional information for each the multiple objects sensed by the sensor in the sensing region. Furthermore, the processing system is configured to determine force information for each of the multiple objects from the determined positional information and the plurality of measures of force applied to the surface. Thus, device and method provides the ability to determine both positional information and force information for each of multiple objects in a sensing region. This can be used to facilitate improved user interface functionality, for example, by providing for specific user interface actions in response to determined indications of force for multiple objects.

BRIEF DESCRIPTION OF DRAWINGS

The preferred exemplary embodiment of the present invention will hereinafter be described in conjunction with the appended drawings, where like designations denote like elements, and wherein.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The embodiments of the present invention provide a device and method that facilitates improved device usability. Specifically, the device and method provide improved user interface functionality by facilitating the determination of both position information and force information for each of multiple objects in a sensing region.

Figure 1:
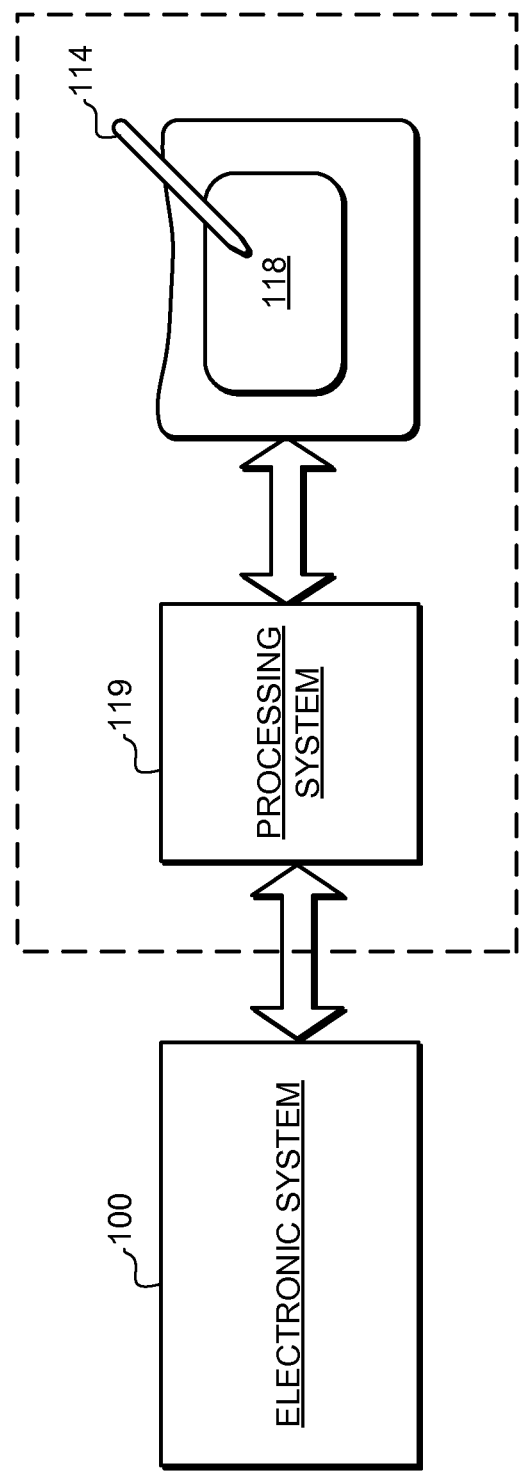
FIG. 1 is a block diagram of an exemplary system that includes an input device in accordance with an embodiment of the invention.

Turning now to the drawing figures, FIG. 1 is a block diagram of an exemplary electronic system 100 that operates with an input device 116. As will be discussed in greater detail below, the input device 116 can be implemented to function as an interface for the electronic system 100. The input device 116 has a sensing region 118 and is implemented with a processing system 119. Not shown in FIG. 1 is an array of sensing electrodes that are adapted to sense objects in the sensing region 118. Also not shown in FIG. 1 are a plurality of force sensors that are coupled to a surface below the sensing region 118 to provide a plurality of measures of force applied to the surface.

The input device 116 is adapted to provide user interface functionality by facilitating data entry responsive to sensed objects and the force applied by such objects. Specifically, the processing system 119 is configured to determine positional information for multiple objects sensed by a sensor in the sensing region 118. This positional information can then be used by the system 100 to provide a wide range of user interface functionality.

Furthermore, the processing system 119 is configured to determine force information for each of the multiple objects from the positional information and the plurality of measures of force determined by the force sensors. This force information can then also be used by the system 100 to provide a wide range of user interface functionality. For example, by providing different user interface functions in response to different levels of applied force by each of multiple objects in the sensing region. Thus, the processing system 119 of input device 116 provides the ability to determine both positional information and force information for each of multiple objects in a sensing region. This can be used to facilitate improved user interface functionality, for example, by providing for specific user interface actions in response to determined indications of force for multiple different objects.

In one embodiment, the processing system 119 is configured to determine the force information for each of the multiple objects using a superposition of the plurality of measures of force based on the positional information for each of the multiple objects. Furthermore, in one specific implementation of this embodiment, the processing system 119 is configured to determine the force information for each of the multiple objects using a pseudo inverse matrix technique.

Returning now to FIG. 1, as described above, the input device 116 includes a sensing region 118. The input device 116 is sensitive to input by one or more input objects (e.g. fingers, styli, etc.), such as the position of an input object 114 within the sensing region 118. "Sensing region" as used herein is intended to broadly encompass any space above, around, in and/or near the input device in which sensor(s) of the input device is able to detect user input. In a conventional embodiment, the sensing region of an input device extends from a surface of the sensor of the input device in one or more directions into space until signal-to-noise ratios prevent sufficiently accurate object detection. The distance to which this sensing region extends in a particular direction may be on the order of less than a millimeter, millimeters, centimeters, or more, and may vary significantly with the type of sensing technology used and the accuracy desired. Thus, embodiments may require contact with the surface, either with or without applied pressure, while others do not. Accordingly, the sizes, shapes, and locations of particular sensing regions may vary widely from embodiment to embodiment.

Sensing regions with rectangular two-dimensional projected shape are common, and many other shapes are possible. For example, depending on the design of the sensor array and surrounding circuitry, shielding from any input objects, and the like, sensing regions may be made to have two-dimensional projections of other shapes. Similar approaches may be used to define the three-dimensional shape of the sensing region. For example, any combination of sensor design, shielding, signal manipulation, and the like may effectively define a sensing region 118 that extends some distance into or out of the page in FIG. 1.

In operation, the input device 116 suitably detects one or more input objects (e.g. the input object 114) within the sensing region 118. The input device 116 thus includes a sensor (not shown) that utilizes any combination sensor components and sensing technologies to implement one or more sensing regions (e.g. sensing region 118) and detect user input such as presences of object(s). Input devices may include any number of structures, such as one or more sensor electrodes, one or more other electrodes, or other structures adapted to detect object presence. As several non-limiting examples, input devices may use capacitive, resistive, inductive, surface acoustic wave, and/or optical techniques. Many of these techniques are advantageous to ones requiring moving mechanical structures (e.g. mechanical switches) as they may have a substantially longer usable life.

For example, sensor(s) of the input device 116 may use arrays or other patterns of capacitive sensor electrodes to support any number of sensing regions 118. As another example, the sensor may use capacitive sensing technology in combination with resistive sensing technology to support the same sensing region or different sensing regions. Examples of the types of technologies that may be used to implement the various embodiments of the invention may be found in U.S. Pat. Nos. 5,543,591, 5,648,642, 5,815,091, 5,841,078, and 6,249,234.

In some capacitive implementations of input devices, a voltage is applied to create an electric field across a sensing surface. These capacitive input devices detect the position of an object by detecting changes in capacitance caused by the changes in the electric field due to the object. The sensor may detect changes in voltage, current, or the like.

As an example, some capacitive implementations utilize resistive sheets, which may be uniformly resistive. The resistive sheets are electrically (usually ohmically) coupled to electrodes. In some embodiments, these electrodes may be located at corners of the resistive sheet, provide current to the resistive sheet, and detect current drawn away by input devices via capacitive coupling to the resistive sheet. In other embodiments, these electrodes are located at other areas of the resistive sheet, and drive or receive other forms of electrical signals. Depending on the implementation, the sensor electrodes may be considered to be the resistive sheets, the electrodes coupled to the resistive sheets, or the combinations of electrodes and resistive sheets.

As another example, some capacitive implementations utilize transcapacitive sensing methods based on the capacitive coupling between sensor electrodes. Transcapacitive sensing methods are sometimes also referred to as "mutual capacitance sensing methods." In one embodiment, a transcapacitive sensing method operates by detecting the electric field coupling one or more transmitting electrodes with one or more receiving electrodes. Proximate objects may cause changes in the electric field, and produce detectable changes in the transcapacitive coupling. Sensor electrodes may transmit as well as receive, either simultaneously or in a time-multiplexed manner. Sensor electrodes that transmit are sometimes referred to as the "transmitting sensor electrodes," "driving sensor electrodes," "transmitters," or "drivers"—at least for the duration when they are transmitting. Other names may also be used, including contractions or combinations of the earlier names (e.g. "driving electrodes" and "driver electrodes") Sensor electrodes that receive are sometimes referred to as "receiving sensor electrodes," "receiver electrodes," or "receivers"—at least for the duration when they are receiving. Similarly, other names may also be used, including contractions or combinations of the earlier names. In one embodiment, a transmitting sensor electrode is modulated relative to a system ground to facilitate transmission. In another embodiment, a receiving sensor electrode is not modulated relative to system ground to facilitate receipt.

In addition to the sensor components and sensing technologies used to implement one or more sensing regions, the input device includes a plurality of force sensors. The plurality of force sensors are coupled to a surface and are configured to provide a plurality a measures of force applied to the surface. As will be described in greater detail below, the plurality of force sensors may be implemented in a variety of different arrangements. To give several examples, the plurality of force sensors can be implemented as three or more force sensors arranged near a perimeter of the sensing region 118. Furthermore, each of the force sensors may be implemented to measure compression force, expansion force, or both, as it is applied at the surface. Finally, a variety of different technologies can be used to implement the force sensors. For example, the force sensors may be implemented with variety of different technologies, including piezoelectric force sensors, capacitive force sensors, and resistive force sensors.

In FIG. 1, the processing system (or "processor") 119 is coupled to the input device 116 and the electronic system 100. Processing systems such as the processing system 119 may perform a variety of processes on the signals received from the sensor(s) and force sensors of the input device 116. For example, processing systems may select or couple individual sensor electrodes, detect presence/proximity, calculate position or motion information, or interpret object motion as gestures. Processing systems may also calibrate individual force sensors and determine force measurements from data provided by the force sensors.

The processing system 119 may provide electrical or electronic indicia based on positional information and force information of input objects (e.g. input object 114) to the electronic system 100. In some embodiments, input devices use associated processing systems to provide electronic indicia of positional information and force information to electronic systems, and the electronic systems process the indicia to act on inputs from users. One exemplary system response is moving a cursor or other object on a display, and the indicia may be processed for any other purpose. In such embodiments, a processing system may report positional and force information to the electronic system constantly, when a threshold is reached, in response criterion such as an identified stroke of object motion, or based on any number and variety of criteria. In some other embodiments, processing systems may directly process the indicia to accept inputs from the user and cause changes on displays or some other actions without interacting with any external processors.

In this specification, the term "processing system" is defined to include one or more processing elements that are adapted to perform the recited operations. Thus, a processing system (e.g. the processing system 119) may comprise all or part of one or more integrated circuits, firmware code, and/or software code that receive electrical signals from the sensor and communicate with its associated electronic system (e.g. the electronic system 100). In some embodiments, all processing elements that comprise a processing system are located together, in or near an associated input device. In other embodiments, the elements of a processing system may be physically separated, with some elements close to an associated input device and some elements elsewhere (such as near other circuitry for the electronic system). In this latter embodiment, minimal processing may be performed by the processing system elements near the input device, and the majority of the processing may be performed by the elements elsewhere, or vice versa.

Furthermore, a processing system (e.g. the processing system 119) may be physically separate from the part of the electronic system (e.g. the electronic system 100) that it communicates with, or the processing system may be implemented integrally with that part of the electronic system. For example, a processing system may reside at least partially on one or more integrated circuits designed to perform other functions for the electronic system aside from implementing the input device.

In some embodiments, the input device is implemented with other input functionality in addition to any sensing regions. For example, the input device 116 of FIG. 1 is implemented with buttons or other input devices near the sensing region 118. The buttons may be used to facilitate selection of items using the proximity sensor device, to provide redundant functionality to the sensing region, or to provide some other functionality or non-functional aesthetic effect. Buttons form just one example of how additional input functionality may be added to the input device 116. In other implementations, input devices such as the input device 116 may include alternate or additional input devices, such as physical or virtual switches, or additional sensing regions. Conversely, in various embodiments, the input device may be implemented with only sensing region input functionality.

Likewise, any positional information determined a processing system may be any suitable indicia of object presence. For example, processing systems may be implemented to determine "one-dimensional" positional information as a scalar (e.g. position or motion along a sensing region). Processing systems may also be implemented to determine multi-dimensional positional information as a combination of values (e.g. two-dimensional horizontal/vertical axes, three-dimensional horizontal/vertical/depth axes, angular/radial axes, or any other combination of axes that span multiple dimensions), and the like. Processing systems may also be implemented to determine information about time or history.

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. Likewise, the term "force information" as used herein is intended to broadly encompass force information regardless of format. For example, the force information can be provided for each object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, an input device such as the input device 116 is adapted as part of a touch screen interface. Specifically, a display screen is overlapped by at least a portion of a sensing region of the input device, such as the sensing region 118. Together, the input device and the display screen provide a touch screen for interfacing with an associated electronic system. The display screen may be any type of electronic display capable of displaying a visual interface to a user, and may include any type of LED (including organic LED (OLED)), CRT, LCD, plasma, EL or other display technology. When so implemented, the input devices may be used to activate functions on the electronic systems. In some embodiments, touch screen implementations allow users to select functions by placing one or more objects in the sensing region proximate an icon or other user interface element indicative of the functions. The input devices may be used to facilitate other user interface interactions, such as scrolling, panning, menu navigation, cursor control, parameter adjustments, and the like. The input devices and display screens of touch screen implementations may share physical elements extensively. For example, some display and sensing technologies may utilize some of the same electrical components for displaying and sensing.

It should be understood that while many embodiments of the invention are to be described herein the context of a fully functioning apparatus, the mechanisms of the present invention are capable of being distributed as a program product in a variety of forms. For example, the mechanisms of the present invention may be implemented and distributed as a sensor program on computer-readable media. Additionally, the embodiments of the present invention apply equally regardless of the particular type of computer-readable medium used to carry out the distribution. Examples of computer-readable media include various discs, memory sticks, memory cards, memory modules, and the like. Computer-readable media may be based on flash, optical, magnetic, holographic, or any other storage technology.

As noted above, the input device 116 is adapted to provide user interface functionality by facilitating data entry responsive to sensed proximate objects and the force applied by such objects. Specifically, the processing system 119 is configured to determine positional information for multiple objects sensed by a sensor in the sensing region 118. Furthermore, the processing system 119 is configured to determine force information for each of the multiple objects from the determined positional information and the plurality of measures of force applied to the surface. Thus, the processing system 119 of input device 116 provides the ability to determine both positional information and force information for each of multiple objects in a sensing region. This may be used to facilitate improved user interface functionality, for example, by providing for specific user interface actions in response to determined indications of position and force for multiple different objects.

Figure 3:
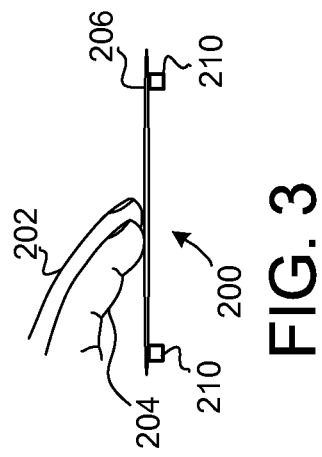
FIG. 3 is a side view an input device with multiple objects in accordance with an embodiment of the invention.
Figure 2:
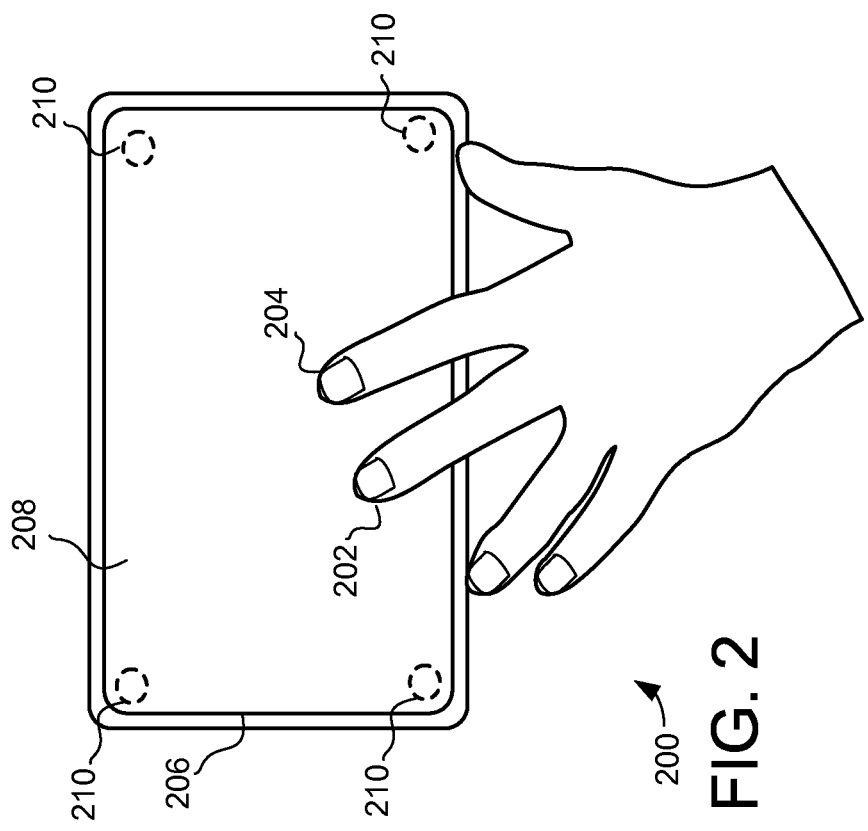
FIG. 2 is a top view an input device with multiple objects in accordance with an embodiment of the invention.

Turning now to FIGS. 2 and 3, examples of objects in a sensing region and applying force to a surface are illustrated. Specifically, FIGS. 2 and 3 show top and side views of an exemplary input device 200. In the illustrated example, user's fingers 202 and 204 provide input to the device 200. Specifically, the input device 200 is configured to determine the position of the fingers 202 and 204 within the sensing region 206 using a sensor. For example, a capacitive proximity sensor, employing a plurality of sensor electrodes, may be configured to detect objects such as the fingers 202 and 204 by detecting changes in transcapacitive coupling between sensor electrodes and to determine the position of the fingers from the detected changes in transcapacitive coupling.

In accordance with the embodiments of the invention, the input device 200 is further configured to determine the force applied to the surface 208 by the fingers 202 and 204. Specifically, a plurality of force sensors 210 are arranged about the sensing region 206. Each of these force sensors provides a measure of the force applied to the surface 208 by the fingers. The processing system is configured to determine the force applied by each individual finger 202 and 204 using the position of the fingers determined by the sensor and the measures of force provided by the force sensors 210.

It should be noted that the determined force is a determined amount of force applied by each individual finger of multiple fingers at the surface 208. Thus, the system may respond differently depending upon which fingers are pressing with what force. The ability to determine the force applied for each of multiple fingers, and to provide different input actions in response to such determined forces, provides a wide flexibility in facilitating user input options.

The embodiments of invention may be used to enable a variety of different capabilities on the input device. For example, it may be used to enable any type of user input based on both force and proximity indications. For example, "press to select" gestures where proximity indications can be used for cursor control and force indications used to select an element. As other examples, continuous measurements of force and proximity for multiple objects may be used for continuation gestures, such as extended zooming, extended scrolling, or extended rotating. In each of these cases, the increased force indications may be used to extend the response, and thus may be used to selectively continue the response. In these cases, it is particularly useful to determine the force and proximity of multiple objects simultaneously, as this provides increased flexibility in determining the intent of the user.

As noted above, in the embodiments of the invention, a plurality of force sensors are arranged about the sensor and configured to provide a measure of the force applied to the surface. Each of these individual force sensors may be implemented with any suitable force sensing technology. For example, the force sensors may be implemented with piezoelectric force sensors, capacitive force sensors, resistive strain gauges and/or force sensing resistors. Additionally, the force sensors may be implemented to measure compression force (i.e., force applied toward the sensor), expansion force (i.e., force applied away from the sensor), or both.

The force sensors are configured to each provide a measure of the force applied to the surface. A variety of different implementations may be used to facilitate this measurement. For example, the sensing element of the force sensor may be directly affixed to the surface. For example, the sensing element may be directly affixed to the underside of the surface or other layer. In such an embodiment, each force sensor may provide a measure of the force that is being applied to the surface by virtue of being directly coupled to the surface. In other embodiments, the force sensor may be indirectly coupled to the surface. For example, through intermediate coupling structures that transfer force, intermediate material layers or both. In any such case, the force sensors are again configured to each provide a measure of the force applied to the surface.

In accordance with the embodiments of the invention, a plurality of force sensors are arranged about the sensor. As will be described in greater detail below, aspects of the invention allow a relatively small number of force sensors to be used while still providing the ability to determine the force applied to the surface by each of multiple objects. For example, in one embodiment two force sensors are arranged about a sensor. In another example, three force sensors are arranged about the sensor. In other embodiments, four or more sensors are arranged about the sensors. As will be explained in greater detail below, a larger number of sensors will generally provide increased accuracy, and in some cases increased redundancy, but the addition of extra sensors will also increase cost and complexity. For these reasons in most embodiments it will be desirable to use between three and eight force sensors about a sensing area.

In general it will be desirable to position each of the plurality of force sensors near the perimeter edge of the sensor and to space the sensors to the greatest extent possible, as this will tend to maximize the accuracy of the sensing measurements. In most cases this will position the sensors near the outer edge of the sensing region. In other cases, it may be near the outer edge of the touch surface, while the sensing region may extend beyond the surface for some distance. Finally, in other embodiments one or more the sensors may be positioned in the interior of the sensor.

Figure 4:
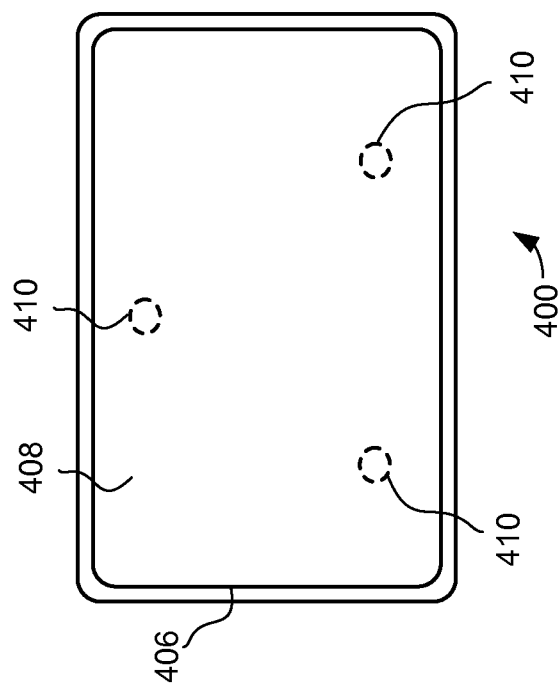

In the example of FIG. 2, four force sensors 210 are positioned near the perimeter of the rectangular sensing region 206 and beneath the surface 208. Turning to FIG. 4, another example of an input device 400 is illustrated. In this example, three force sensors 410 are positioned within the perimeter of the sensing region 406 and beneath the surface 408. In this example, the force sensors 410 are position farther away from the perimeter than those illustrated in FIG. 2.

Figure 5:
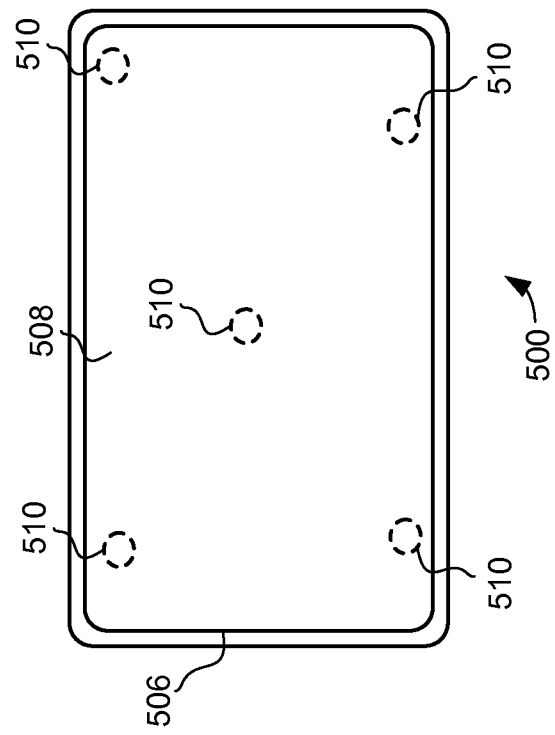
FIGS. 4-7 are top views of input devices in accordance with an embodiment of the invention.

Turning to FIG. 5, another example of an input device 500 is illustrated. In this example, five force sensors 510 are positioned within the perimeter of the sensing region 506 and beneath the surface 508. In this embodiment, one of the force sensors 510 is positioned in the center area of the sensing region 506, while the other four sensors 510 are positioned nearer the perimeter of the sensing region 506.

Figure 6:
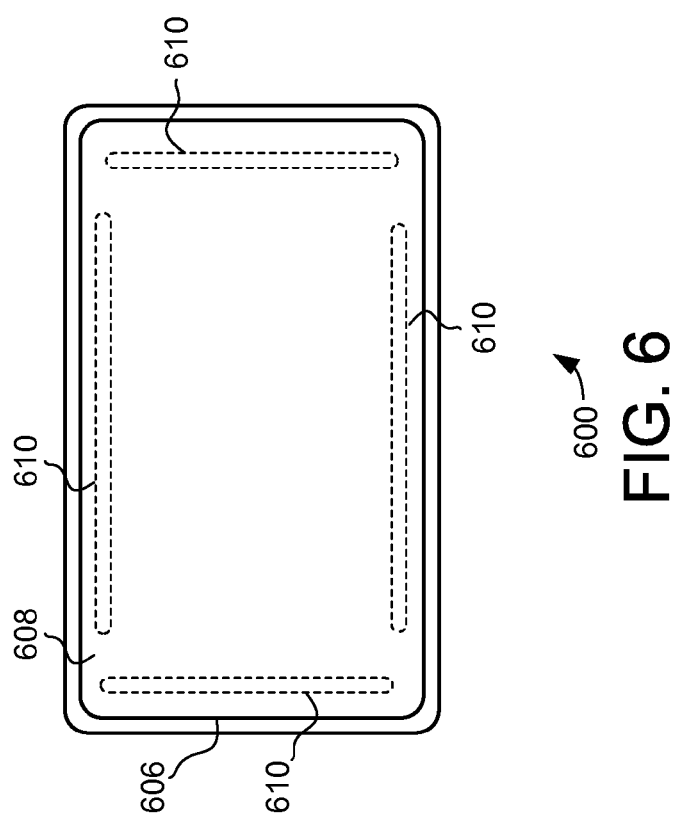

Turning to FIG. 6, another example of an input device 600 is illustrated. In this example, four force sensors 610 are positioned within the perimeter of the sensing region 606 and beneath the surface 608. In this embodiment, each of the force sensors 610 provides a measure of force over a larger rectangular area. This type of sensor may be implemented with a force sensing resistor or suitable device.

Figure 7:
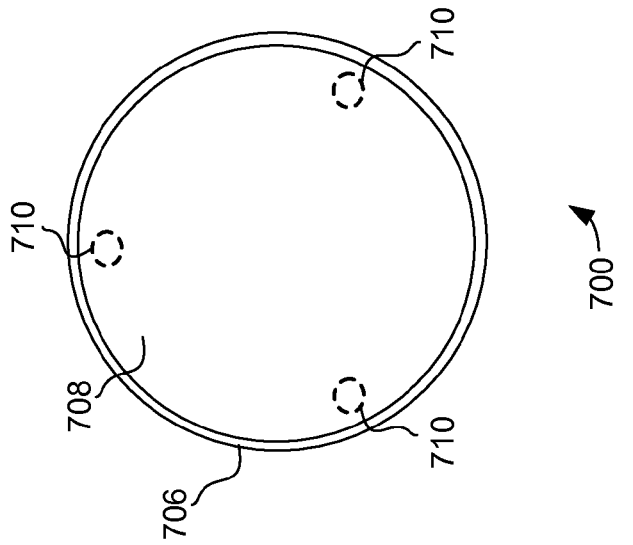

The embodiments of the invention may also be applied to different shapes of input devices. Turning to FIG. 7, another example of an input device 700 is illustrated. In this example, three force sensors 710 are positioned within the perimeter of the sensing region 706 and beneath the surface 708, where the sensing region 706 has a circular shape. In such an embodiment, the sensor may provide position information in different coordinate systems, such as in a polar coordinates. However, the use of x-y coordinate systems, either directly or through coordinate conversion in such a sensor may also be provided.

It should be noted that while FIGS. 2-7 illustrate various sensing regions and surfaces that are largely coextensive, that this is not required in all embodiments. For example, in some embodiments the shape of the sensing region may extend well beyond the primary surface that is presented to the user. In other embodiments, the opposite may be true.

As will be explained in greater detail below, the surface and other layers of the input device may be implemented with different types of materials having different physical properties. For example, the surface may be implemented with materials having different levels of physical rigidity. Thus, in some embodiments the surface will significantly deflect and bend with the application of force by a user. In other embodiments, the surface will have greater rigidity and thus will be largely immune to bending during normal usage. These different implementations may give the user different user experiences. For example, facilitating deflection provides a lever of feedback to the user that corresponds to the force they are applying. Typically, in order to provide for significant amounts of deflection the sensor may be configured with structures that provide room for the sensing layers to bend appropriately. For example, with the use of spring-like structures. Furthermore, as will be discussed in greater detail below, the techniques used in the determination of force for each of multiple objects in the sensing region may be adapted to account for the amount of deflection that may occur in the surface during use.

A detailed discussion of the techniques that can be employed to determine force information for multiple objects in the sensing region will not be discussed. In general, the techniques use the position information for each object determined by the sensor and the plurality of measures of force to determine an amount of applied force for each object. Specifically, the technique uses superposition of the plurality of measures of force based on the positional information for each of the multiple objects to determine the force applied for each object. In one implementation of this embodiment, this superposition is calculated using a pseudo-inverse matrix technique.

As one example, an input device may be provided with four force sensors, each providing a force measurement ($F_{TL}$, $F_{TR}$, $F_{BL}$, $F_{BR}$). As described above, the input device is configured to determine positional information for multiple objects using a sensor, such as a capacitive proximity sensor. In this example, the position of objects within the sensing region is expressed using x and y coordinate position values. Thus, the position of two detected objects in the sensing region may be expressed as values $(x_0, y_0)$, $(x_1, y_1)$. Using a linear model, and assuming a rectangular sensor size of W×H, the relationship between the position of two detected objects $(x_0, y_0)$, $(x_1, y_1)$, four measured force values ($F_{TL}$, $F_{TR}$, $F_{BL}$, $F_{BR}$), and the forces applied by the two objects ($F_0$, $F_1$) may be expressed by the matrix equation:

$$\begin{bmatrix} 0.75 - \frac{x_0}{2W} - \frac{y_0}{2H} & 0.75 - \frac{x_1}{2W} - \frac{y_1}{2H} \\ 0.25 + \frac{x_0}{2W} - \frac{y_0}{2H} & 0.25 + \frac{x_1}{2W} - \frac{y_1}{2H} \\ 0.25 - \frac{x_0}{2W} + \frac{y_0}{2H} & 0.25 - \frac{x_1}{2W} - \frac{y_1}{2H} \\ -0.25 + \frac{x_0}{2W} + \frac{y_0}{2H} & -0.25 + \frac{x_1}{2W} + \frac{y_1}{2H} \end{bmatrix} \begin{bmatrix} F_0 \\ F_1 \end{bmatrix} = \begin{bmatrix} F_{TL} \\ F_{TR} \\ F_{BL} \\ F_{BR} \end{bmatrix}. \qquad \text{Equation 1}$$

The matrix in Equation 1 describes a set of four equations with two unknowns (i.e., the forces $F_0$, $F_1$ applied by the two objects). Additionally, the sum of the forces applied to the sensor equals the sum of the measured forces. Thus, $F_0 + F_1 = F_{TL} + F_{TR} + F_{BL} + F_{BR}$.

The processing system of the input device may be adapted to solve for these two unknowns, and thus determine the two individual forces applied by the two input objects. Specifically, Equation 1 can be written in shorthand matrix form as:

$$AX = B \qquad \text{Equation 2.}$$

Where X is the matrix containing the force elements $F_0$, $F_1$ to be solved for. The pseudo-inverse relationship of this matrix equation can be expressed as:

$$X = (A^T A)^{-1} AB \qquad \text{Equation 3.}$$

Thus, using a pseudo-inverse matrix technique, the processing system can solve for the force values $F_0$, $F_1$ for both objects. Specifically, the pseudo-inverse matrix technique (sometimes referred as a generalized inverse technique) provides a technique that may be used to solve over-determined systems where there are more equations than unknowns by minimizing the error in the solution. In some implementations, this technique is configured to minimize a global error. In other implementations, this technique is configured to minimize a least mean squares error. In either case, the pseudo-inverse matrix technique minimizes the error to provide a solution to the set of equations. It should be noted the pseudo-inverse matrix technique is just one example of the types of the techniques that may be used, and in general, any technique that may be used to solve an over-determined system may be used.

Thus, the processing system may receive the position information for each of two objects $(x_0, y_0)$, $(x_1, y_1)$, four measured force values ($F_{TL}$, $F_{TR}$, $F_{BL}$, $F_{BR}$), and from this determine the individual forces ($F_0$, $F_1$) that are being applied by each of the two objects.

Such a system may also solve for the forces applied to the surface by three objects ($F_0$, $F_1$, $F_2$) as long as the three objects are in a non-collinear arrangement. In that example, the matrix equation:

$$\begin{bmatrix} 0.75 - \frac{x_0}{2W} - \frac{y_0}{2H} & 0.75 - \frac{x_1}{2W} - \frac{y_1}{2H} & 0.75 - \frac{x_2}{2W} - \frac{y_2}{2H} \\ 0.25 + \frac{x_0}{2W} - \frac{y_0}{2H} & 0.25 + \frac{x_1}{2W} - \frac{y_1}{2H} & 0.25 + \frac{x_2}{2W} - \frac{y_2}{2H} \\ 0.25 - \frac{x_0}{2W} + \frac{y_0}{2H} & 0.25 - \frac{x_1}{2W} - \frac{y_1}{2H} & 0.25 - \frac{x_2}{2W} - \frac{y_2}{2H} \\ -0.25 + \frac{x_0}{2W} + \frac{y_0}{2H} & -0.25 + \frac{x_1}{2W} + \frac{y_1}{2H} & -0.25 + \frac{x_2}{2W} + \frac{y_2}{2H} \end{bmatrix} \begin{bmatrix} F_0 \\ F_1 \\ F_2 \end{bmatrix} = \begin{bmatrix} F_{TL} \\ F_{TR} \\ F_{BL} \\ F_{BR} \end{bmatrix}.$$

Equation 4 defines the forces ($F_0$, $F_1$, $F_2$) applied by the three objects that are to be determined. This matrix equation describes a set of four equations with three unknowns, and the processing system may be adapted to solve for those unknowns using the same pseudo-inverse relationship described above.

These examples provide the ability to determine the forces applied by two or three objects in the sensing region. It should be noted that while these examples describe solving for force values using a system that includes four force sensors similar techniques may also be applied to systems that have different numbers of force sensors. In general, each additional force sensor provides additional data that may be used to determine force. Thus, an increased number of sensors increases the number of equations that are available to generate solutions. The same type of techniques described above may thus be used to solve such an over determined system, generally with increased accuracy of the determined force. Additionally, the use of an increased number of sensors may provide redundancy in case the case of sensor failure.

As was described above, the input device may be implemented with a variety of different materials, including surface materials with different levels of rigidity. In embodiments where the surface material is configured to bend and deflect a significant amount with the application of force, the system may be configured to account for those deflections. This will result in a more accurate determination of the applied forces in these embodiments.

As one example, an input device may again be provided with four force sensors, each providing a force measurement ($F_{TL}$, $F_{TR}$, $F_{BL}$, $F_{BR}$). The position of two detected objects in the sensing region again be determined by the sensor and expressed as position values ($x_0$, $y_0$), ($x_1$, $y_1$). Assuming deflection of the surface in response to the applied force, and again assuming a rectangular sensor size of W×H, the relationship between the position of two detected objects ($x_0$, $y_0$), ($x_1$, $y_1$), four measured force values ($F_{TL}$, $F_{TR}$, $F_{BL}$, $F_{BR}$), and the forces applied by the two objects ($F_0$, $F_1$) can be expressed by the matrix equation:

$$\begin{bmatrix} \left(1-\frac{x_0}{W}\right)\left(1-\frac{y_0}{H}\right) & \left(1-\frac{x_1}{W}\right)\left(1-\frac{y_1}{H}\right) \\ \left(\frac{x_0}{W}\right)\left(1-\frac{y_0}{H}\right) & \left(\frac{x_1}{W}\right)\left(1-\frac{y_1}{H}\right) \\ \left(1-\frac{x_0}{W}\right)\left(\frac{y_0}{H}\right) & \left(1-\frac{x_1}{W}\right)\left(\frac{y_1}{H}\right) \\ \left(\frac{x_0}{W}\right)\left(\frac{y_0}{H}\right) & \left(\frac{x_1}{W}\right)\left(\frac{y_1}{H}\right) \end{bmatrix} \begin{bmatrix} F_0 \\ F_1 \end{bmatrix} = \begin{bmatrix} F_{TL} \\ F_{TR} \\ F_{BL} \\ F_{BR} \end{bmatrix}.$$

Equation 5

The matrix Equation 5 again describes a set of four equations with two unknowns (i.e., the forces $F_0$,$F_1$ applied by the objects). These two unknowns may again be solved for using a pseudo-inverse matrix technique or any other suitable technique for solving an over-determined system.

Such a system may again also solve for the forces applied to the surface by three objects ($F_0$, $F_1$, $F_2$) as long as the three objects are in a non-collinear arrangement. In that example, the matrix equation:

$$\begin{bmatrix} \left(1-\frac{x_0}{W}\right)\left(1-\frac{y_0}{H}\right) & \left(1-\frac{x_1}{W}\right)\left(1-\frac{y_1}{H}\right) & \left(1-\frac{x_2}{W}\right)\left(1-\frac{y_2}{H}\right) \\ \left(\frac{x_0}{W}\right)\left(1-\frac{y_0}{H}\right) & \left(\frac{x_1}{W}\right)\left(1-\frac{y_1}{H}\right) & \left(\frac{x_2}{W}\right)\left(1-\frac{y_2}{H}\right) \\ \left(1-\frac{x_0}{W}\right)\left(\frac{y_0}{H}\right) & \left(1-\frac{x_1}{W}\right)\left(\frac{y_1}{H}\right) & \left(1-\frac{x_2}{W}\right)\left(\frac{y_2}{H}\right) \\ \left(\frac{x_0}{W}\right)\left(\frac{y_0}{H}\right) & \left(\frac{x_1}{W}\right)\left(\frac{y_1}{H}\right) & \left(\frac{x_2}{W}\right)\left(\frac{y_2}{H}\right) \end{bmatrix} \begin{bmatrix} F_0 \\ F_1 \\ F_2 \end{bmatrix} = \begin{bmatrix} F_{TL} \\ F_{TR} \\ F_{BL} \\ F_{BR} \end{bmatrix}.$$

Equation 6 defines the forces ($F_0$, $F_1$, $F_2$) applied by the three objects that are to be determined. This matrix equation describes a set of four equations with three unknowns, and the processing system may be adapted to solve for those unknowns using the same pseudo-inverse relationship described above.

The relationships defined in Equations 5 and 6 can likewise be adapted to sensors with different numbers, shapes and configurations of force sensors.

When so determined, the force values may be used to facilitate a wide array of user interface functionality. As descried above, the system may be used to enable any type of user input based on both force and proximity indications. For example, continuous measurements of force and proximity for multiple objects may be used for extended zooming, scrolling or rotating. It may also be used for virtual keyboard applications and press to select gestures.

In a variation on these embodiments, the measures of force provided by the force sensors may also be used to disambiguate object position. Specifically, in some types of sensors the presence of two objects in the sensing region can lead to ambiguity in object position. This is typically an issue in input devices that use capacitive proximity sensors configured to generate one-dimensional profiles and generate object position from those one-dimensional profiles.

Figure 8:
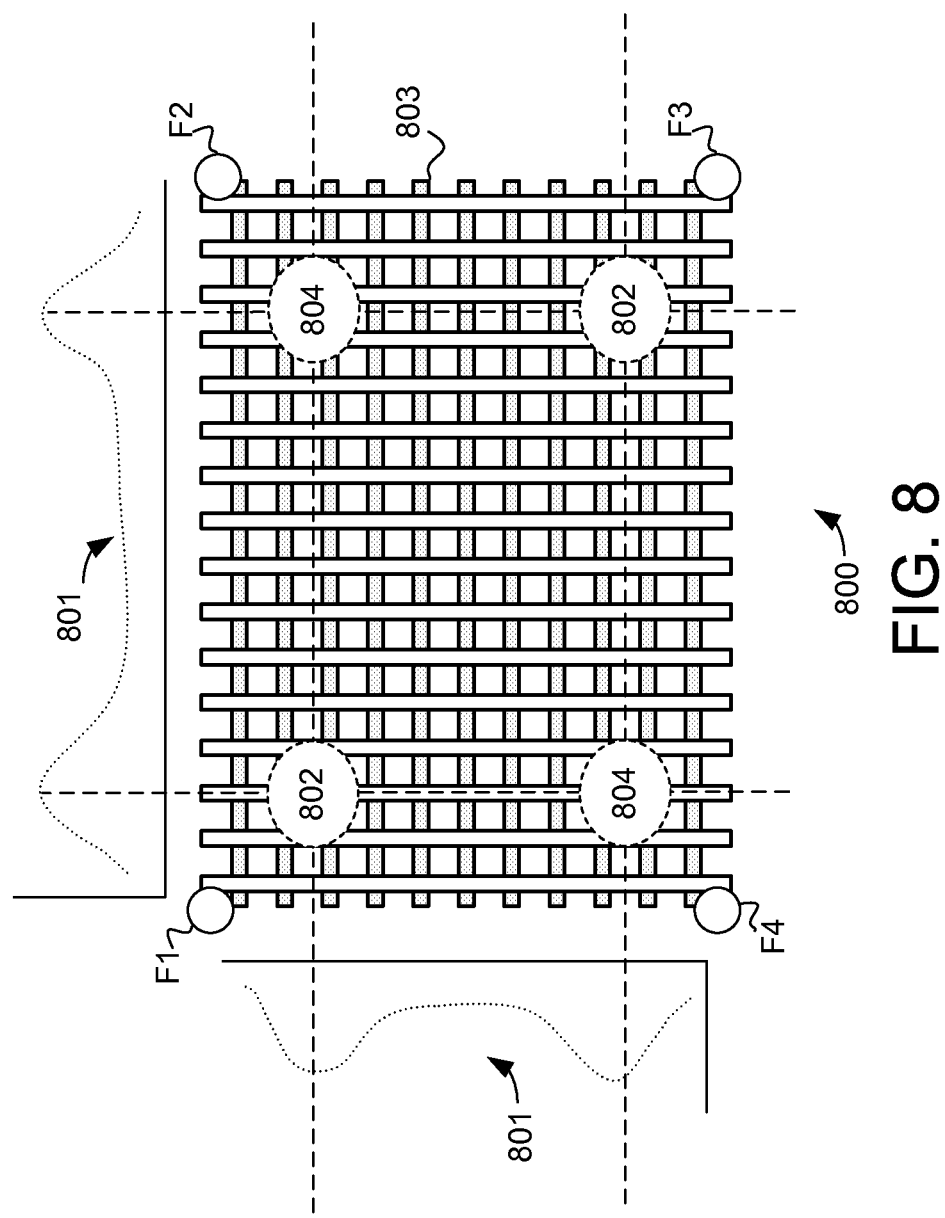
FIG. 8 is a top view of an exemplary proximity sensor using one-dimensional profiles to determine object position.

Turing to FIG. 8, an exemplary input device 800 is illustrated. The input device 800 includes an array of sensing electrodes 803 and four force sensors F1, F2, F3, and F4. Also illustrated are X and Y coordinate profiles 801 that may be generated from the presence of two objects in the sensing region of electrodes 803. As shown in FIG. 8 with the X and Y coordinate profile data alone, ambiguity exists as to whether the two objects are in positions 802 or in positions 804 (with the potential positions illustrated as dashed ovals in FIG. 8), as either option results in the same illustrated X and Y coordinate profiles 801.

In this implementation, the measures of force provided by the force sensors F1-F4 may be used to disambiguate the position of the objects. Specifically, because applied force is higher at sensors that are closer to the objects, the measures of force may be used to determine in which of the two locations the objects are actually positioned. For example, if force sensors F1 and F3 measures significantly larger force than sensors F2 and F4, this indicates that the objects are likely at positions 802. Conversely, if the force sensors F2 and F4 measure significantly larger force than sensors F1 and F3, this indicates that the objects are likely at positions 804. Thus, the measures of force can be used to disambiguate the position of the two objects.

Once the position of the objects has been disambiguated, the individual force values for each object can be calculated as described above. Thus, the measured values from the force sensors may be used for both disambiguating object position, and with the object position determined, for determining the force applied by each individual object. Using the force sensor to disambiguate may allow for the use of low cost profile sensors that otherwise may not be able to disambiguate multiple finger positions under certain circumstances.

Thus, the embodiments of the present invention provide devices and methods that facilitate user input determined from both positional information and force information for each of multiple objects in a sensing region. In these embodiments, the processing system is configured to determine positional information for each the multiple objects sensed by the sensor in the sensing region. Furthermore, the processing system is configured to determine force information for each of the multiple objects from the positional information and the plurality of measures of force applied to the surface. Thus, the devices and methods provide the ability to determine both positional information and force information for each of multiple objects in a sensing region. This can be used to facilitate improved user interface functionality, for example, by providing for specific user interface actions in response to determined indications of force for multiple objects.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device comprising:
   a surface;
   a sensor configured to simultaneously sense multiple objects in a sensing region proximate the surface;
   a plurality force sensors, each of the plurality of force sensors coupled to the surface such that the plurality of force sensors provide a plurality of measures of force applied to the surface;
   a processing system coupled to the sensor and to the plurality of force sensors, the processing system configured to:
      determine positional information for each of the multiple objects simultaneously sensed by the sensor in the sensing region; and
      determine force information for the each of the multiple objects from:
         the positional information for each of the multiple objects; and
         the plurality of measures of force applied to the surface.

2. The input device of claim 1 wherein the plurality of force sensors comprises at least three force sensors.

3. The input device of claim 1 wherein the multiple objects comprises 2 or 3 objects.

4. The input device of claim 1 wherein the sensor is selected from the group consisting of a capacitive sensor, and an optical sensor.

5. The input device of claim 1 wherein each of the plurality of force sensors is arranged near a perimeter edge of the sensing region.

6. The input device of claim 1 wherein each of the plurality of force sensors is selected from a group consisting of piezoelectric force sensors, capacitive force sensors, resistive strain gauges and force sensing resistors.

7. The input device of claim 1 wherein each of the plurality of force sensors is configured to measure both compression and expansion.

8. The input device of claim 1 wherein the processing system is configured to determine force information for the each of the multiple objects from the positional information for each of the multiple objects and the plurality of measures of force applied to the surface by:
   using a superposition of the plurality of measures of force based on the positional information for each of the multiple objects.

9. The input device of claim 1 wherein the processing system is configured to determine force information for the each of the multiple objects from the positional information for each of the multiple objects and the plurality of measures of force applied to the surface by:
   solving an over-determined system of equations defining a superposition of the plurality of measures of force based on the positional information for each of the multiple objects.

10. The input device of claim 1 wherein the processing system is configured to determine force information for the each of the multiple objects from the positional information for each of the multiple objects and the plurality of measures of force applied to the surface by:
   using a pseudo-inverse matrix technique to determine a superposition of the plurality of measures of force based on the positional information for each of the multiple objects.

11. The input device of claim 1 wherein the plurality of force sensors are arranged such that at least two of the plurality of force sensor are each near a corner of the sensing region.

12. The input device of claim 1 wherein the processing system is configured to determine positional information for each of multiple objects sensed by the sensor in the sensing region by:
   disambiguating the positional information using at least one of the plurality of measures of force applied to the surface.

13. An input device comprising:
   a surface;
   a capacitive sensor configured to capacitively sense at least two objects simultaneously in a sensing region proximate the surface;
   at least three force sensors, each of the at least three force sensors coupled to the surface such that the at least three force sensors provide at least three measures of force applied to the surface, where at least two of the at least three force sensors are positioned near a perimeter of the sensing region;

a processing system coupled to the capacitive sensor and to the at least three force sensors, the processing system configured to:
- determine positional information for each of the at least two objects simultaneously sensed by the sensor in the sensing region; and
- determine individual force information for the each of the at least two objects from:
  - the positional information for the each of the at least two objects; and
  - the at least three measures of force applied to the surface.

14. A method comprising the steps of:
- simultaneously sensing multiple objects with a sensor;
- determining positional information for each of the multiple objects simultaneously sensed by the sensor;
- determining a plurality of measures of force applied to a surface of the sensor; and
- determining force information for the each of the multiple objects from:
  - the positional information for each of the multiple objects; and
  - the plurality of measures of force applied to the surface.

15. The method of claim 14 wherein the plurality of measures of force comprise at least three measures of force.

16. The method of claim 14 wherein the multiple objects comprises 2 or 3 objects.

17. The method of claim 14 wherein the step of sensing multiple objects with a sensor comprises sensing with at least one of the group consisting of a capacitive sensor, and an optical sensor.

18. The method of claim 14 wherein the step of determining the plurality of measures of force applied to the surface of the sensor comprises using a plurality of force sensors arranged near a perimeter edge of the surface.

19. The method of claim 14 wherein the step of determining the plurality of measures of force applied to the surface of the sensor comprises using force sensors selected from a group consisting of piezeoelectric force sensors, capacitive force sensors, and resistive strain gauges, and force sensing resistors.

20. The method of claim 14 wherein the step of determining the plurality of measures of force applied to the surface of the sensor comprises using force sensors configured to measure both compression and expansion.

21. The method of claim 14 wherein the step of determining the plurality of measures of force applied to a surface comprises using force sensors arranged such that at least two of force sensors are near a corner of the surface.

22. The method of claim 14 wherein the step of determining force information for the each of the multiple objects from the positional information for each of the multiple objects and the plurality of measures of force applied to the surface comprises:
- solving an over-determined system of equations defining a superposition of the plurality of measures of force based on the positional information for each of the multiple objects.

23. The method of claim 14 wherein the step of determining force information for the each of the multiple objects from the positional information for each of the multiple objects and the plurality of measures of force applied to the surface comprises:
- using a superposition of the plurality of measures of force based on the positional information for each of the multiple objects.

24. The method of claim 14 wherein the step of determining force information for the each of the multiple objects from the positional information for each of the multiple objects and the plurality of measures of force applied to the surface comprises:
- using a pseudo-inverse matrix technique to determine a superposition of the plurality of measures of force based on the positional information for each of the multiple objects.

25. The method of claim 14 wherein the step of determining positional information for each of the multiple objects sensed by the sensor comprises disambiguating the positional information using at least one of the plurality of measures of force applied to the surface.

* * * * *